United States Patent
Rácz et al.

(10) Patent No.: US 11,584,007 B2
(45) Date of Patent: Feb. 21, 2023

(54) ROBOTIC METHOD AND SYSTEM

(71) Applicant: Telefonaktiebolaget LM Ericsson (publ), Stockholm (SE)

(72) Inventors: Sándor Rácz, Cegléd (HU); Norbert Reider, Tényö (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 16/650,134

(22) PCT Filed: Oct. 30, 2017

(86) PCT No.: PCT/EP2017/077790
§ 371 (c)(1),
(2) Date: Mar. 24, 2020

(87) PCT Pub. No.: WO2019/086102
PCT Pub. Date: May 9, 2019

(65) Prior Publication Data
US 2021/0094177 A1 Apr. 1, 2021

(51) Int. Cl.
*B25J 9/16* (2006.01)

(52) U.S. Cl.
CPC ............ *B25J 9/1666* (2013.01); *B25J 9/1694* (2013.01)

(58) Field of Classification Search
CPC ...... B25J 9/1666; B25J 9/1669; B25J 9/1674; B25J 9/1676; B25J 9/1664; B25J 9/1694; B25J 13/006; G05B 19/4185; G05B 19/41855
See application file for complete search history.

(56) References Cited

U.S. PATENT DOCUMENTS

| | | | |
|---|---|---|---|
| 7,130,718 B2 | 10/2006 | Gunnarsson et al. | |
| 11,096,069 B2 * | 8/2021 | Dang | H04L 5/0041 |
| 2007/0238985 A1 | 10/2007 | Smith et al. | |
| 2008/0086236 A1 * | 4/2008 | Saito | G01S 5/0252 |
| | | | 901/1 |

FOREIGN PATENT DOCUMENTS

| | | | |
|---|---|---|---|
| CA | 2979242 A1 * | 3/2012 | ............ H04W 24/10 |
| CN | 105223950 A | 1/2016 | |
| CN | 106426189 A | 2/2017 | |
| JP | 2017167625 A | 9/2017 | |

OTHER PUBLICATIONS

Ghaffarkhah, A. et al., "Dynamic Coverage of Time-Varying Environments Using a Mobile Robot—a Communication-Aware Perspective", 2011 IEEE GLOBECOM Workshops (GC Wkshps), Dec. 5, 2011, pp. 1297-1302, IEEE.
Kehoe, B. et al., "A Survey of Research on Cloud Robotics and Automation", IEEE Transactions on Automation Science and Engineering, vol. 12 No. 2, Apr. 1, 2015, pp. 398-409, IEEE.

* cited by examiner

*Primary Examiner* — Spencer D Patton
(74) *Attorney, Agent, or Firm* — Coats & Bennett, PLLC (57) ABSTRACT

We generally describe a method comprising: processing (S602) data relating to a path of movement of a robotic device (122) comprising or coupled to a sensor (124) in radio communication with a cloud platform (112); and updating (S604), based on the processed data, the path of movement to improve the radio communication.

16 Claims, 5 Drawing Sheets

ROBOTIC METHOD AND SYSTEM

TECHNICAL FIELD

The present disclosure generally relates to a method in which a path of movement of a robotic device is updated in order to improve radio communication of a sensor, a system configured to perform the method and a computer program product comprising program code portions for performing the method.

BACKGROUND

Cloud robotics is a field in which cloud technologies such as cloud computing, cloud storage and other internet-based technologies may be exploited in view of providing services shared for robotics applications.

Moving robotics and automation algorithms into the cloud may require frameworks which facilitate this transition. The cloud may provide different possible levels at which a framework may be implemented. The lowest level is Infrastructure as a Service (IaaS), where bare operating systems may be provided on (possibly virtualized) machines in the cloud. The second level, Platform as a Service (PaaS), may provide more structure, including application frameworks and database access, while restricting the choice of programming languages, system architectures, and database models which may be used. Software as a Service (SaaS), the highest level of structure, is missing at present.

The current focus of cloud based robotics is to either speed up the processing of input data collected from many sensors with big data computation. Another approach is to collect various knowledge bases in centralized locations, for example, possible grasping poses of various 3D objects.

Current industrial robot deployments consist, for example, of a robotic arm and a controller deployed very close to it. The controller may have predefined commands which may have to be performed. The controller and the arm may be connected via proprietary industrial protocols.

Prior art can be found in, for example, U.S. Pat. No. 7,130,718 B2, which generally relates to a method for an industrial robot to increase accuracy in movements of the robot. A first path is formed by bringing a tool supported by the robot to adopt a plurality of generated positions. A plurality of observed positions of the tool moving along the first path is determined. A second path is formed of the determined tool positions. A correction is determined by a path deviation between geometrically determined positions in the first path and the second path.

US 2007/0238985 A1 generally relates to a system utilizing radio frequency signals for tracking and improving navigation of slender instruments during insertion in the body. The disclosure relates to a system for utilizing radio frequency signals to dynamically determine the location of a medical device throughout a procedure and to improve navigation of the medical device. For these purposes, a plurality of RF receivers is mounted at operative locations in the operating room and operates on the same clock signal. The system also utilizes a diagnostic medical image such as an MRI, and overlays the position feedback signal on the image. This allows, for example, a surgeon to pick a desired spot on the diagnostic image, and then cause a robotic arm driven device to be moved to that particular spot inside the human body.

CN 106426189 A generally relates to an automatic deviation correcting method for workpiece clamping of a grinding and polishing robot. The method includes firstly selecting a standard part via a manual demonstration way of an operator for each batch of workpieces to be ground, and measuring the position data of the standard part via a detector, transmitting commands via a control computer to enable the robot to automatically clamp the workpieces to be corrected, and measuring the position data of the workpieces to be corrected via the detector; calculating deviation based on the position data of the standard part and the workpieces to be corrected by the control computer to obtain displacement and angle deflection of the workpieces to be corrected relative to the standard part, and transmitting them to the robot controller; adjusting the coordinates of the workpieces to be corrected by the robot controller according to the displacement and angle deflection, controlling manipulators to grind and polish as per the adjusted coordinate positions, and completing online deviation correction of workpieces. The automatic deviation correcting method can complete online deviation correction of workpieces, the processing quality of products is greatly improved, and the defective rate is decreased.

However, there is a need for further improvements to controlling robotic devices.

SUMMARY

Controlling a robot from the cloud is currently out of the scope of the robotics industry due to lack of trustworthy low delayed wireless/wired link and strategic decisions. It has been realized that wireless access to actuators, sensors and/or controllers in an industrial environment is a promising use-case. For example, a robot arm (or generally a robotic device) may comprise a replaceable end effector. For example, a tool may first be mounted on the robotic device in order to perform a certain job (for example welding), and after finishing the job, a camera module or another sensor mounted on the robotic device may be used to check the quality of the performed job.

However, as current solutions do not use the potential in cloud-based coordinated control of industrial robot cells from a wireless communication point of view, it is an object of example implementations according to the present disclosure to provide a method and a system with new functionalities using a cloud robotic platform.

There are therefore provided a method, a system and a computer program product as set out in the independent claims. Preferred implementations thereof are outlined in the dependent claims.

In a first aspect according to the present disclosure, there is provided a method comprising: processing data relating to a path of movement of a robotic device comprising or coupled to a sensor in radio communication with a cloud platform; and updating, based on the processed data, the path of movement to improve the radio communication.

The data which is to be processed hereby refers to data relating to an original (i.e. originally intended) path of movement of the robotic device. This data relating to the originally intended path of movement may be obtained, in some examples, by the sensor comprised in or coupled to the robotic device, or may be obtained using another feature of the robotic device or another sensor coupled to or in communication with the robotic device. One or more of these may be in communication (in particular radio communication) with a processor (which may be coupled to one or more of the above-identified devices for obtaining the data relating to the originally intended path of movement) at which the data relating to the originally intended path of movement may be processed.

The robotic device may hereby, in some examples, relate to or comprise a robotic arm. Furthermore, additionally or alternatively therefrom, the sensor may, in some example implementations, relate to or comprise a camera, which may, for example, be used in order to check the quality of a job performed using the robotic device.

The cloud platform may hereby refer to an infrastructure (which may comprise hardware and/or software) which may be accessed, for example, by the robotic device and which may provide, for example, one or more of IaaS, PaaS and SaaS.

In some variants, improvement of the radio communication comprises a change of a radio communication parameter indicative of a quality of the radio communication. The radio communication parameter may hereby relate to, for example, one or more of a signal strength associated with the radio communication, a bandwidth associated with the radio communication, and a signal-to-noise ratio of a signal sent between the sensor and the cloud platform. Additional or alternative types of radio communication parameters indicative of the quality of the radio communication will be readily known to those with skill in the art.

In some examples, as outlined above, improvement of the radio communication may comprise achieving a better quality of the radio communication, for example, and additionally or alternatively to the above-specified (types of) radio communication parameters, an optimized (for example, increased) radio channel capacity of the radio channel associated with the radio communication, and a feasibility of a data volume collected by the sensor during a cycle (for example a movement cycle of the path of movement of the robotic device) or generally when moving together with the robotic device. It will be appreciated that alternative or additional characteristics may be considered to relate to improvements of the radio communication, as may be previously determined.

It will further be appreciated that the path of movement of the robotic device may, in some examples, relate to a general, i.e. overall path of movement of the robotic device. Additionally or alternatively, the path of movement may relate to specific locations, tools or parts (for example effectors) of the robotic device moving along a certain path or visiting certain points along the path.

Using example implementations as described herein, processing the path of movement (i.e. data relating to the path of movement) may allow for updating or correcting the path of movement in order to improve radio communication efficiency of the sensor comprised in or coupled to (for example, mounted on an end of the robotic device, such as a robotic arm) the robotic device with the cloud platform. Improving the radio communication between the sensor and the cloud platform by updating the path of movement of the robotic device may, for example, allow for better control of the robotic device exploiting the cloud platform.

Technologies of the cloud platform may relate, for example, to cloud computing and cloud storage.

In some variants of the method, the processing is performed in the cloud platform. Processing of the data relating to the path of movement of the robotic device may therefore be outsourced to the cloud platform with its large computing capacity and computing power.

In some further example implementations of the method, the data relating to the path of movement to be processed is generated by a robotic application coupled or integral to the robotic device and sent, by the robotic application, to the cloud platform for processing. Data relating to the path of movement to be processed may hereby be obtained locally at the robotic device for efficiency.

In some variants of the method, updating the path of movement is based on updated path of movement data being generated in the cloud platform. This may allow using the large computing power and capacity of the cloud for generating the data. The updated path of movement data may then be transmitted to the robotic device, that is a control unit comprised in, coupled to or in communication with the robotic device, so that the robotic device may perform the updated path of movement based on the updated path of movement data.

In some example implementations, the method further comprises sending a communication demand for the radio communication to the cloud platform, and determining, based on the processed data, whether the communication demand is satisfied. The communication demand may hereby comprise, for example, a required bandwidth (i.e. a bandwidth higher than a predetermined level) and/or a certain data volume which may need to be achieved, and which may, in some examples, be calculated or estimated based on the bandwidth and the timing of the trajectory, i.e. path of movement of the robotic device.

In some variants of the method, the path of movement is updated if (for example only if) the communication demand is not satisfied.

In some further example implementations, if the communication demand is not satisfied, the method comprises one or more of: modifying an orientation of the sensor; modifying an orientation of a tool of the robotic device to which the sensor is coupled; modifying a speed of movement of the robotic device; and modifying coordinates of the path of movement within a predetermined range.

The orientation of the sensor may hereby in particular be modified when the robotic device travels between two working positions and/or the sensor does not collect any information or data.

Any of the modifications of the orientation of the sensor, the orientation of the tool of the robotic device to which the sensor is coupled, the speed of movement of the robotic device and the coordinates of the path of movement within the predetermined range may result in an improvement of the radio communication.

In some variants of the method, modifying the speed of movement of the robotic device comprises slowing down the speed of movement when the robotic device travels through an area in which quality of the radio communication is above a predetermined threshold or when the robotic device is located at a location at which quality of the radio communication is above the predetermined threshold. An improved radio communication may hereby be established, for example, for a longer period of time in order for data to be transmitted from the sensor to the cloud platform (and equally in the other direction) during improved radio communication conditions.

In some further example implementations of the method, modifying the orientation of the sensor and/or the tool, the speed and the coordinates is performed in a predetermined order, and wherein one or more of modifying the orientation of the sensor and/or the tool, the speed and the coordinates are performed only if a previous modification (or previous modifications) has (have) not led to the communication demand being satisfied. Hereby, certain priorities between possibilities for modifications as specified above may be established while aiming to improve radio communication between the sensor and the cloud platform. It will be understood that these priorities may relate to one or more radio communication characteristics associated with each of the modifications, such as, for example, energy consumption or other characteristics.

In some variants of the method, updating the path of movement comprises inserting a path segment into the path of movement, wherein quality of the radio communication is known for when the robotic device is located within the inserted path segment. Data may hereby be transmitted between the sensor and the cloud platform during improved or adequate radio communication conditions.

In some variants in which one or more of the orientation of the sensor, the orientation of the tool of the robotic device to which the sensor is coupled, the speed of movement of the robotic device and the coordinates of the path of movement (within a predetermined range) are modified, the path segment may be inserted into the path of movement only if none of modifying the orientation of the sensor, the orientation of the tool, the speed of movement and the coordinates has led to the communication demand being satisfied. Inserting the path segment into the path of movement may hereby be a last resort for making sure that a specific communication demand is met, which may, for example, result in adequate radio communication quality between the sensor and the cloud platform.

In some example implementations, the method further comprises determining radio channel capacity of a radio communication channel associated with the radio communication, and wherein determining whether the communication demand is satisfied is dependent from the radio channel capacity. This may be preferable in particular in view of a given radio channel capacity influencing, in some examples, the radio communication between the sensor and the cloud platform.

In some variants of the method, determining whether the communication demand is satisfied is based on determining a path loss of the radio communication for a path point of the path of movement. It will be understood that the path loss may hereby be determined for a single path point only, or for a plurality of path points, as required. The path loss may hereby be a measure for determining as to whether the communication demand is satisfied.

In some variants, determining the path loss comprises comparing a first, current bandwidth of the radio communication for the path point with a second, previously determined bandwidth of the radio communication for the path point, wherein data relating to the second, previously determined bandwidth is stored in a radio communication database. The radio communication database may, in some examples, be stored in a memory comprised in, coupled to or in communication with the robotic device or the sensor. In some example implementations, the radio communication database may be stored in the cloud, thereby exploiting the large storage capacity of the cloud.

In some further variants of the method, the data relating to the path of movement comprises one or more of: Cartesian points of the path of movement; an orientation of an effector of the robotic device; and a time for the effector or another part of the robotic device to reach one or more predetermined points on the path of movement.

An original path of movement, which contains the Cartesian points, the orientation of the effector and the time for the effector or the another part of the robotic device to reach the one or more predetermined points on the path of movement, may hereby be generated by a path generation unit comprised in, coupled to or in communication with the robotic device.

In some example implementations of the method, updating the path of movement is performed only within predetermined deviations from initial values of the Cartesian points, the orientation of the effector and the time for the effector or the another part of the robotic device to reach the one or more predetermined points on the path of movement. The robotic device may hereby perform movements only within certain limits, which may ensure, for example, that one or more boundary conditions are satisfied. These boundary conditions may, for example, relate to physical limitations of a robotic cell in which to robotic device is arranged. Other boundary conditions will be readily known to those with skill in the art.

In some variants of the method, the deviations are accepted to be larger for connecting paths of the path of movement than for one or both of control points and control paths of the path of movement, wherein the robotic device must visit the control points and control paths at least within a predetermined control point range and control path range, respectively. This means that, in some examples, the robotic device may hereby, during movement, need to visit certain points on connecting paths within a predetermined connecting path range only, whereby the connecting path range is larger compared to the control point range or the control path range, respectively. The different ranges may hereby be compared, for example, by using relative deviations from an ideal point or path, respectively.

We further describe a method, in particular as depicted according to any one of the variants and example implementations as outlined herein, wherein the method comprises processing, in a cloud platform, data relating to a path of movement of a robotic device comprising or coupled to a sensor; and updating, based on the processed data, the path of movement of the robotic device to improve radio communication of the sensor.

In some variants, improvement of the radio communication comprises a change of a radio communication parameter indicative of one or both of (i) a quality of the radio communication of the sensor with a third device (for example the cloud platform, which may be used to control the robotic device, or another controller for the robotic device), and (ii) a radio communication property intrinsic to the sensor. The radio communication parameter may hereby relate to, for example, one or more of a signal strength associated with the radio communication of the sensor with the third device (and/or the cloud platform), a bandwidth associated with the radio communication, and a signal-to-noise ratio of a signal sent between the sensor and the third device and/or the cloud platform. The radio communication property intrinsic to the sensor may hereby relate to, for example, a setting of the sensor, whereby the setting is related to, for example, a radio communication capability of the sensor.

Therefore, the improved radio communication may relate to a radio communication characteristic of or using the sensor. The improved radio communication characteristic may relate, in some examples, as outlined above, to a better quality of radio communication of the sensor with the cloud platform and/or with another device, such as, but not limited to a control device for the robotic device, and in some examples, an optimized (for example, increased) radio channel capacity of the radio channel associated with the radio communication of the sensor with the cloud platform and/or the other device (for example to robotic device controller), and feasibility of a data volume collected by the sensor during a cycle (for example a movement cycle of the path of movement of the robotic device) or generally when moving together with the robotic device. It will be appreciated that alternative or additional characteristics may be considered to relate to improvements of the radio communication characteristic of the sensor.

The radio communication characteristic of the sensor may hereby relate to a radio communication characteristic (for example capability) intrinsic to the sensor, and/or to a radio communication characteristic of a radio communication channel between the sensor and one or both of the cloud and a third device (such as, but not limited to a controller for the robotic device).

As outlined above, processing the data relating to the path of movement of the robotic device in the cloud platform may exploit the large computing (i.e. processing) power of the cloud.

The robotic device may be better controllable by a controller (which may be in radio communication with the robotic device) given the improvement to the radio communication characteristic of the sensor.

In a related aspect of the present disclosure, we describe a system comprising a robotic device comprising a robotic application running thereon or (directly or indirectly) coupled thereto; and a cloud platform in communication with the robotic application; wherein the system is configured to perform the method of any one of the variants and example implementations as described herein.

We further describe a computer program product comprising program code portions for performing the method according to any one of the variants and example implementations as described herein, when the computer program product is executed on one or more computing devices, in particular wherein the one or more computing devices are coupled or integral to the cloud platform.

In some variants, the computer program product is stored on a computer-readable recording medium. Alternatively or additionally, in some example implementations, the computer program product is stored in the cloud, thereby making use of the large power and storage capacities of the cloud.

BRIEF DESCRIPTION OF THE DRAWINGS

These and other aspects of the present disclosure will now be further described, by way of example only, with reference to the accompanying figures, wherein like reference numerals refer to like parts, and in which.

DETAILED DESCRIPTION

We generally describe herein a method (and a corresponding system) which preprocesses a path of movement of a robotic device, which may be a robotic arm, and corrects the path of movement in order to increase efficiency of radio communication of a sensor attached or coupled to the robotic device. Pre-processing may hereby refer to processing data which relates to an originally intended path of movement of the robotic device, such that the outcome (or output) of the pre-processing of the data relating to the originally intended path of movement may be a deviation from the originally intended path of movement before the robotic device has actually gone through the originally intended path of movement.

In some examples, a robotic arm path correction may be used to leverage and improve radio communication of the sensor. The sensor may hereby, in some examples, be mounted on an end portion of a robotic arm. The robotic arm may therefore be extended with a sensor (for example a camera mounted on an end portion of the robotic arm in order to on-line observe a workpiece). The sensor is, in example implementations as described herein, connected to the cloud over wireless connection and may, in some instances, have limited buffering capability.

Figure 1:
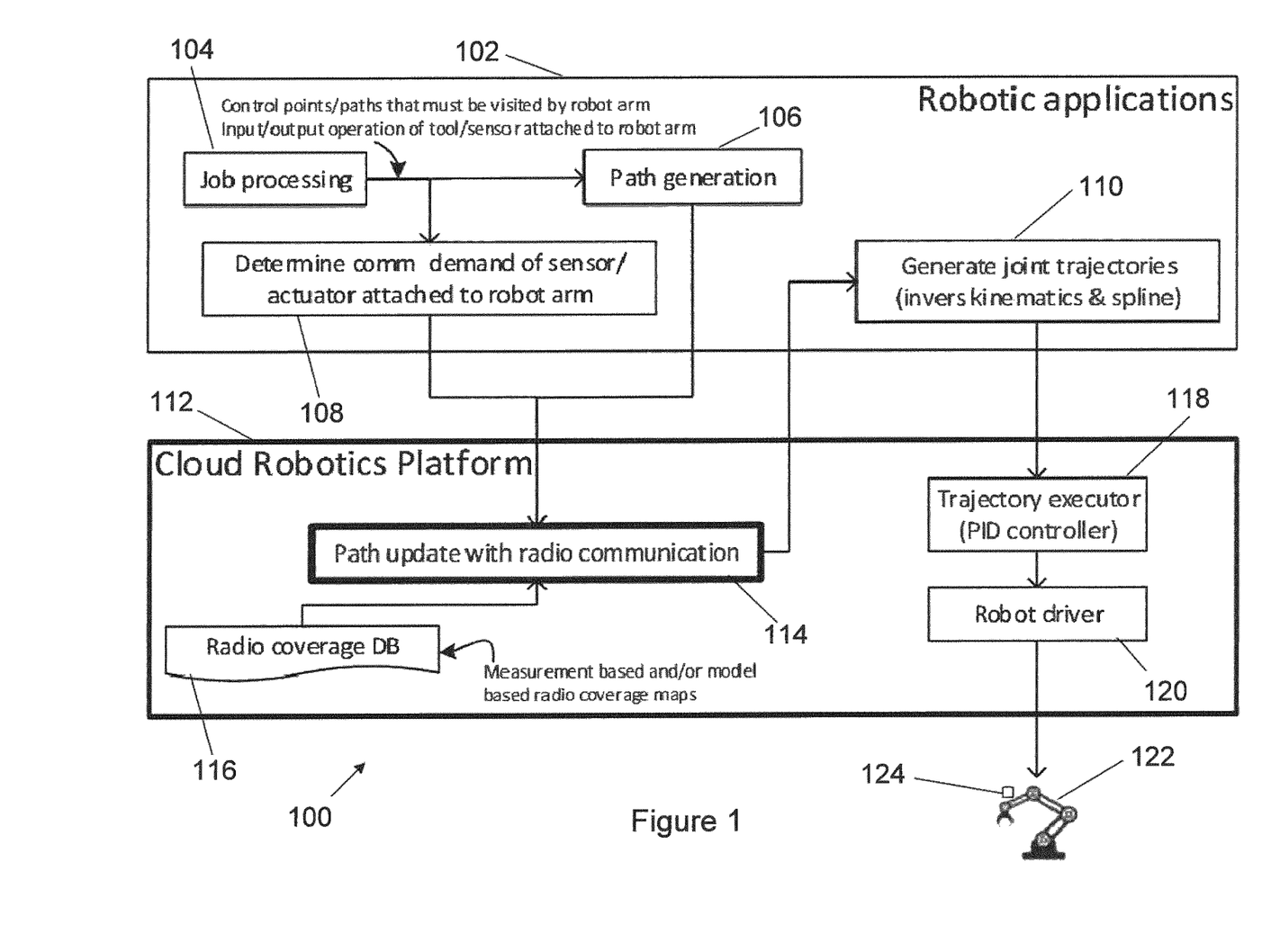
FIG. 1 shows a schematic illustration of a system according to some example implementations as described herein.

FIG. 1 shows a schematic illustration of a system 100 according to some example implementations as described herein.

As can be seen from the example architecture of FIG. 1, a new functionality to a cloud robotics platform (cloud platform 112), i.e. a Path Update with Radio Communication (PURC) 114 is provided.

In this example, the system 100 comprises a robotic application 102 (or a plurality of robotic applications) and a cloud platform 112 (dubbed cloud robotics platform).

In this example, conditions as to control points or paths which must be visited by the robotic arm are handled in the robotic application 102. Furthermore, information or data relating to input or output operation of a tool of the robotic arm or a sensor attached to the robotic arm is processed in the robotic application 102. This information or data is obtained, in this example, during job processing 104 (which may relate, in some examples, to a workpiece being worked on by the tool of the robotic arm).

Data relating to the job processing 104 is, in this example, processed in order to determine, at processing step 108, the communication demand of the sensor and/or the actuator attached to the robotic arm.

In this example, a path of movement is generated at a path generation unit 106 in the robotic application 102.

The robotic application 102 then sends the generated path and, in this example, the communication demand (for example an estimated data volume collected by the sensor during a cycle) to PURC 114.

Data relating to the path generated in the robotic application 102 is then provided to the cloud platform 112 and, in this example, pre-processed in the cloud platform 112 in order to evaluate feasibility of the required communication demand over the radio channel. If necessary, the PURC 114 proposes a correction to the original path of movement.

During the evaluation, radio coverage database 116, which is built up in the cloud platform 112, is used, in this example, in order to determine the radio channel capacity when the robotic arm travels along the path of movement. Measurement-based and/or model-based radio coverage maps may, in some examples, be accessed for the aforementioned determination of the radio channel capacity.

In this example, and as will be further outlined below, the PURC 114 first checks whether the communication demand is feasible without any change in the path of movement. If the communication demand is not feasible, the PURC 114 proposes correction to the path of movement. In the first instance, the PURC 114 tries to modify the orientation of the sensor 124 (which is mounted, in this example, on an end portion of the robotic arm 122) when the robotic arm 122 travels between two working positions and the sensor 124 does not collect any information.

In this example, if the above operation is not enough in order to satisfy communication demand of the sensor, the PURC 114 tries to modify (in some examples, slow down) the speed of movement of the robotic arm 122 when the robotic arm 122 travels through an area with sufficient or desired radio conditions (for example radio communication qualities).

In this example, if the afore-mentioned processes are still not sufficient for the communication demand to be satisfied, the PURC 114 proposes modifying the path of movement where the sensor collects information.

Finally, in this example, if the above-specified processes do not result in the communication demand being satisfied, if necessary, the PURC 114 proposes inserting a new path segment (with known good, i.e. sufficient radio quality) for radio communication purposes.

In this example implementation, data relating to the updated path is sent from the cloud platform 112 to the robotic application 102. In the robotic application 102, in this example, joint trajectories are generated at processing step 110 (for example using inverse kinematics and spline).

In this example, the generated joint trajectories are sent from the robotic application 102 to the cloud platform 112. In this example, the data is provided to a trajectory executor 118 comprised in the cloud platform 112, whereby the trajectory executor 118 may be, for example, a PID controller.

In this example, the cloud platform 112 further comprises a robot driver 120 coupled to the trajectory executor 118. The robot driver 120 then controls the robotic arm 122 based on the data provided to it by the trajectory executor 118.

Figure 2:
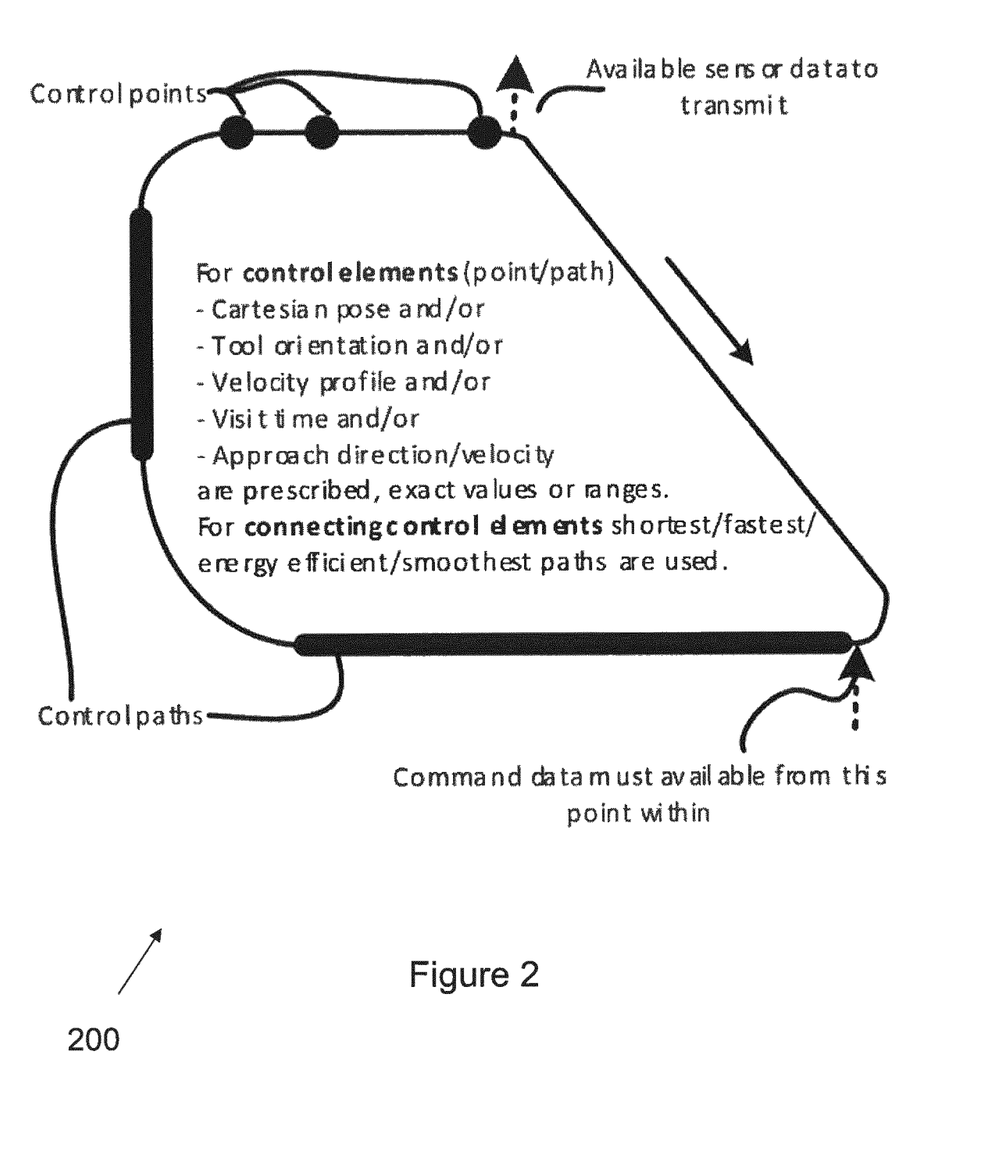
FIG. 2 shows a schematic illustration of a path of movement of a robotic device according to some example implementations as described herein.

FIG. 2 shows a schematic illustration of a path of movement 200 of a robotic device according to some example implementations as described herein.

In this example, there are control points and control paths which must be visited by the robotic device in general or by certain parts or components (such as actuators) of the robotic device. The robotic device or parts or components thereof having to visit certain control points and/or control paths may, in some examples, mean that the device, parts or components must visit the control points and/or control paths within a predetermined range or margin of error. Depending on the task, different path parameters may be specified with one or more target values and one or more acceptable ranges.

In this example, the control elements (i.e. point(s)/path(s)) comprise one or more of: a Cartesian pose, a tool orientation, a velocity profile, a visit time (of the robotic device or parts or components thereof at certain locations), an approach direction with respect to, for example, a workpiece to be processed by the robotic device, and an approach velocity with respect to, for example, the workpiece. Exact values and acceptable ranges may also be prescribed.

In this example, for connecting control elements, the shortest and/or fastest and/or most energy-efficient and/or smoothest paths are used.

In FIG. 2, certain control points and paths are identified. Furthermore, a location is indicated at which the sensor must be able to transmit data. Further still, in the lower part of FIG. 2, a point is indicated at which command data must be available.

The above-identified ranges may be important for various reasons. For example, for a welding process, the velocity of the tool may be important, such that a target velocity may be prescribed within a small acceptable range around the target velocity.

Furthermore, the approach direction may be important in particular when the object to be processed by the tool of the robotic device is in a hidden area.

As outlined above, between two control elements, the robotic device may use the shortest and/or fastest and/or most energy-efficient and/or smoothest path to go through and no specific path may be prescribed in some instances.

Figure 3:
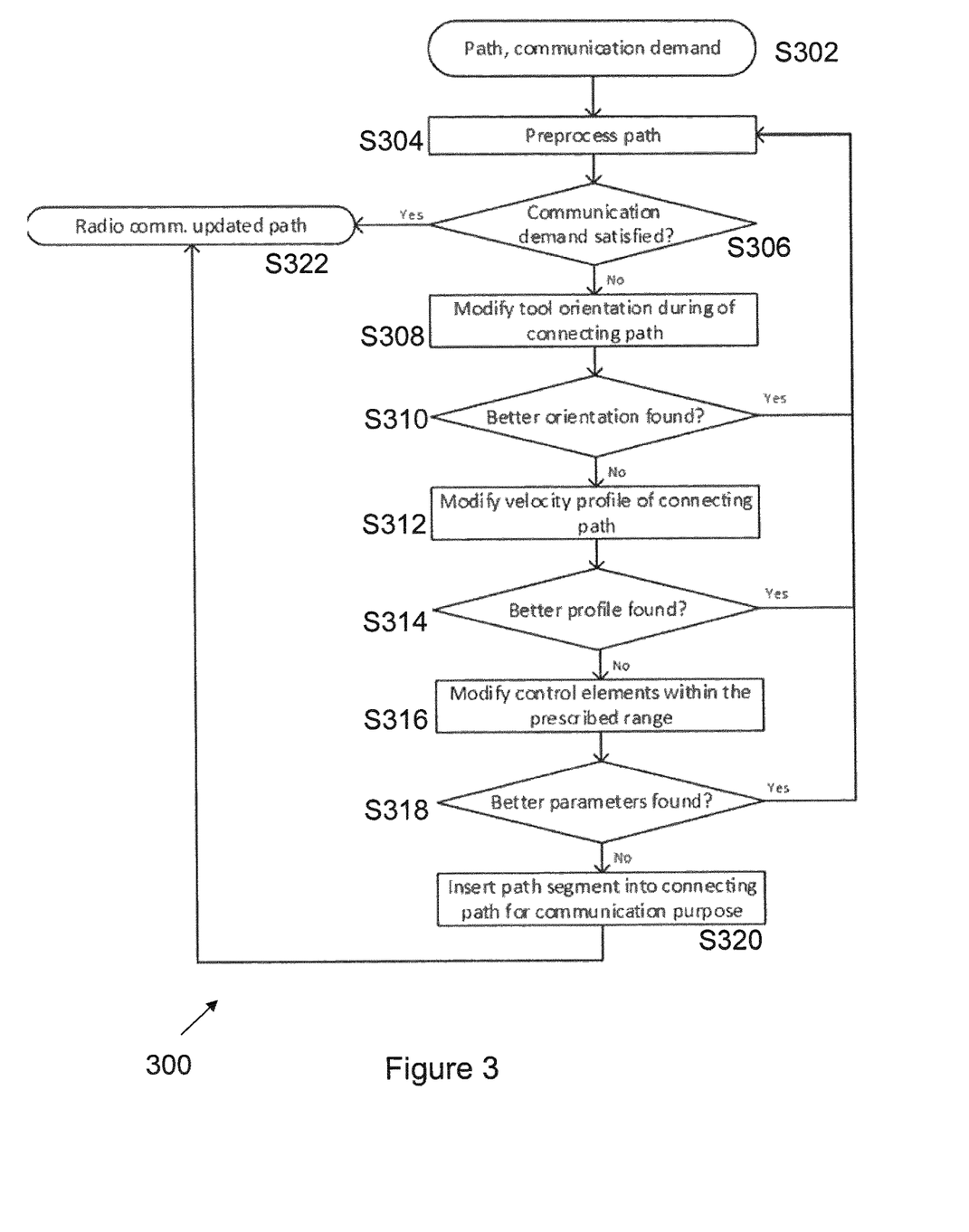
FIG. 3 shows a flow-diagram of a method according to some example implementations as described herein.

FIG. 3 shows a flow-diagram 300 of a method according to some example implementations as described herein.

In some variants, the method tries to modify the characteristics (for example the orientation of the sensor or a tool of the robotic device, or a velocity profile of the robotic device) of the original path while keeping the Cartesian positions unchanged.

In this example, the path generation unit 106 (see FIG. 1) provides, at step S302, data relating to the original path to the cloud platform 112, which contains data relating to a series of (i) Cartesian points, (ii) orientations of the end effector of the robotic arm, and (iii) the time for the robotic device to reach the points.

In addition to this, in this example, for each point, a tolerance range may also be given which describes the maximum acceptable deviation from the original value.

An example for a path may be:

| T[sec] | X[m] | Y[m] | Z[m] | Rx[deg] | Ry[deg] | Rz[deg] |
|--------|------|------|------|---------|---------|---------|
| 0      | 0.1  | 0.2  | 0.3  | 0       | 0       | 90      |
| 0.1    | 0.15 | 0.2  | 0.35 | 0       | 0       | 85      |
| 0.2    | 0.2  | 0.2  | 0.4  | 0       | 0       | 0.82    |

An example for a tolerance range may be:

| dT[%]   | dX[%] | dY[%] | dZ[%] | dRx[%] | dRy[%] | dRz[%] |
|---------|-------|-------|-------|--------|--------|--------|
| +0; −25 | +−1   | +−1   | +−1   | +−5    | +−5    | +−1    |
| +0; −25 | +−1   | +−1   | +−1   | +−5    | +−5    | +−1    |
| +0; −5  | +−1   | +−1   | +−1   | +−1    | +−1    | +−1    |

In this example, T refers hereby to a time parameter, X, Y and Z are Cartesian points, and Rx, Ry and Rz refer to the orientation of the end effector of the robotic arm.

In this example, the tolerance range of [−25%, 0%] for the first two time parameters means that through these points, the velocity of the robotic arm is allowed to slow down up to 25%, but not allowed to go through them with higher velocity ("+0"). Typically, for control points and control paths, tighter ranges may be prescribed. Meanwhile, for connecting path, less restrictive ranges may be prescribed.

As can be seen in FIG. 3, the generated path is pre-processed at step S304 (for example in the cloud platform 112). As outlined above, in other words, the data relating to the originally intended path of movement is processed.

It is then determined at step S306 as to whether the communication demand is satisfied.

If the communication demand is satisfied, the method continues with step S322 at which, in this example, no parameters are modified with respect to the original path.

If, however, the communication demand cannot be satisfied with the original path, as determined at step S306, in this example, the tool orientation is modified at step S308 during movement of the robotic device along a connecting path. In some examples, it is the orientation of the end effector which is modified at step S308.

It is then determined at step S310 as to whether a better orientation has been found. The better orientation may refer to an improved quality of radio communication. If a better orientation has been found, the method returns to step S304, at which the pre-processed path is generated, and the path of movement may ultimately be updated. If, however, no better orientation has been found, the velocity profile is modified at step S312 during movement of the robotic device along the connecting path.

It is then determined, at step S314, as to whether a better velocity profile has been found. Such a better velocity profile may relate to an improved quality of radio communication.

If a better velocity profile has been found, in this example, the method returns to step S304, at which the pre-processed path is generated, and the path of movement may ultimately be updated. If, however, no better velocity profile has been found, control elements are modified within a prescribed range at step S316.

It is then determined, at step S318, as to whether better parameters for the control elements (a list of which is outlined above) have been found. Better parameters for the control elements may refer to an improved quality of radio communication.

If better parameters have been found, the method returns to step S304, at which the pre-processed path is generated, and the path of movement may ultimately be updated. If, however, no better parameters have been found, a path segment is inserted into the connecting path for communication purposes at step S320. It may hereby be known that the communication demand is satisfied when the robotic device or the component or part thereof travels through the inserted path segment.

Based on the inserted path segment, the method then continues with step S322, at which the path of movement is updated in view of the improved radio communication.

Example implementations of the method as described herein may work in a "greedy" manner in which, at each step, the method takes the radio optimal values from one or more allowed parameter ranges, for example, by taking orientations with best radio qualities within the allowed range for each (time and/or location and/or orientation) point.

Alternatively, the method may be integrated in an iterative method.

In order to check feasibility of the communication demand, radio and communication channel models may be used. In addition to this, the estimated upload/download data volume provided by the robotic application may be used. For example, for each path point, a path loss may be determined (for example queried from the radio coverage database 116), from which achievable bandwidths of radio communication may be calculated. Based on the calculated bandwidths and the timing of the trajectory, an achievable data volume may be estimated.

Figure 4:
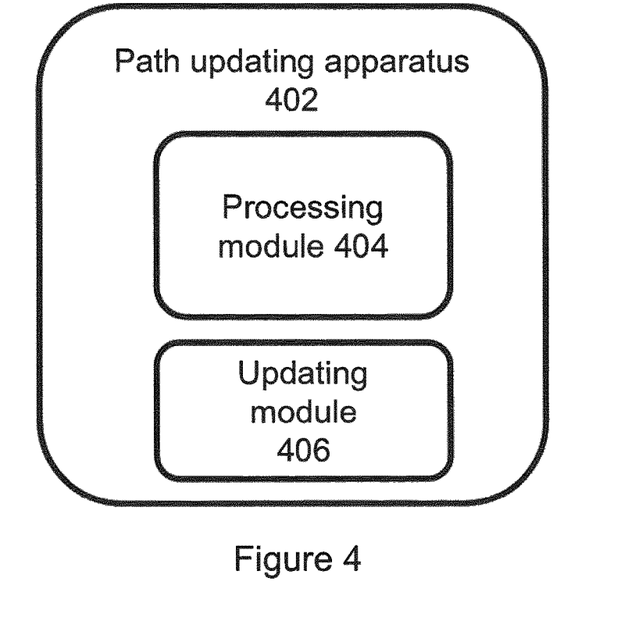
FIG. 4 shows a schematic block-diagram of a path updating apparatus according to some example implementations as described herein.

In order to realize the above and further functionalities for updating the path of movement of the robotic device in order to improve radio communication, a path updating apparatus 402 is provided in example implementations as described herein, as shown in the block-diagram of FIG. 4.

The path updating apparatus 402 comprises, in this example, a processing module 404 configured for processing data relating to the (e.g. original) path of movement of the robotic device, and an updating module 406 configured to update, based on the processed data, the path of movement in order to improve radio communication of the sensor.

Figure 5:
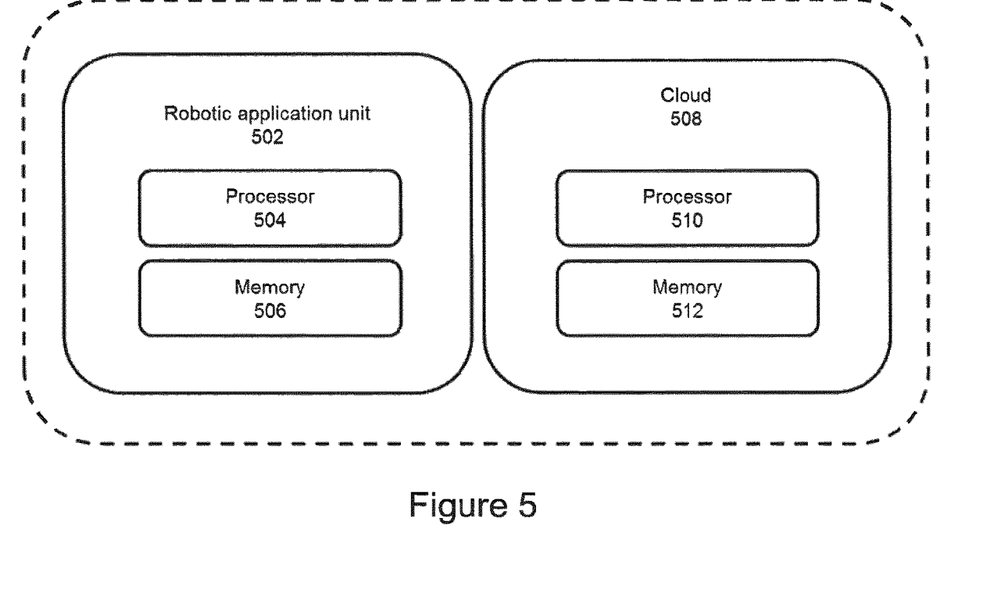
FIG. 5 shows a further schematic block-diagram of a system according to some example implementations as described herein.

In a further exemplary implementation, as shown in the block-diagram of FIG. 5, the system comprises a robotic application unit 502 and a cloud 508. In this example, the robotic application unit 502 comprises a processor 504 and memory 506. Furthermore, in this example, cloud 508 comprises a processor 510 and memory 512.

The memory 506 is coupled to the processor 504 and comprises program code portions that allow the robotic application unit 502 in particular to generate data of an original path to be provided to the cloud 508 for (pre-) processing, generally as described herein according to various example implementations.

The memory 512 is coupled to the processor 510 and comprises program code portions that allow in particular (pre-)processing of the generated path data (the original path data and/or the updated path data) in the cloud 508 according to various example implementations as described herein.

Figure 6:
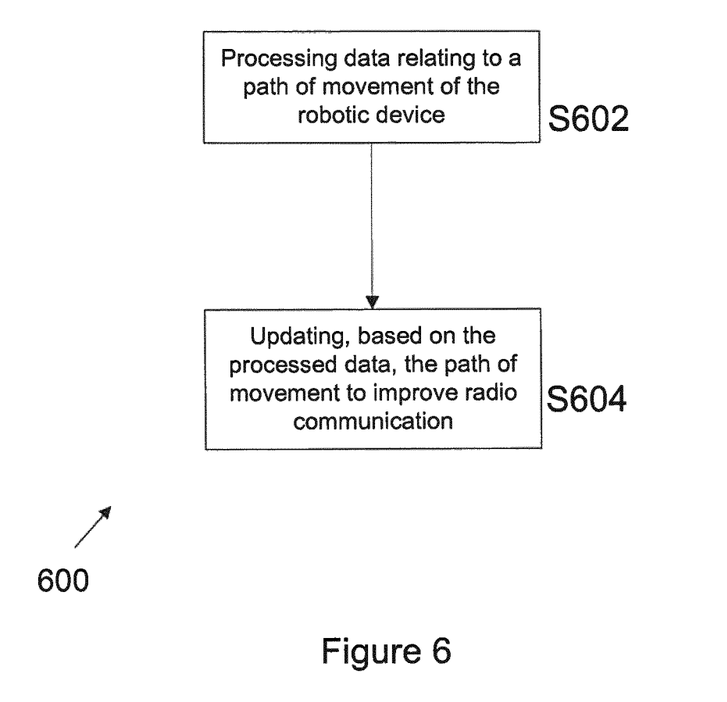
FIG. 6 shows a flow-diagram of a method according to some example implementations as described herein.

FIG. 6 shows a flow-diagram 600 of a method according to some example implementations as described herein.

At step S602, data relating to a path of movement of the robotic device is processed. Processing of the (e.g. original) data may be performed, in some examples, in the cloud (platform). At step S604, the path of movement is updated, based on the processed data, in order to improve radio communication of the sensor.

As can be seen from the present disclosure, example implementations of the method and system described herein may allow for efficient and more coordinated use of wireless access, for example, in a plant area where robot cells may be deployed and controlled from the cloud.

Radio communication aspects of wireless sensors moved by, for example, a robotic arm may be handled in the cloud robotics platform and provided to robotics applications as a service.

Hereby, a new functionality in the cloud robotics platform is provided. This functionality provides a service to a robotic application in order to optimize radio communication (of the sensor as such, and/or of the sensor with the cloud and/or a third device, such as, for example, a controller for the robotic device). The path generated by the robotic application may be pre-processed and corrected in order to improve radio communication efficiency.

No doubt many other effective alternatives will occur to the skilled person. It will be understood that the present disclosure is not limited to the described variants and encompasses modifications apparent to those skilled in the art and lying within the scope of the claims appended hereto.

The invention claimed is:

1. A method, comprising:
   processing data relating to a path of movement of a robotic device comprising or coupled to a sensor in radio communication with a cloud platform;
   determining, based on the processed data, whether a communication demand is satisfied;
   in response to the communication demand not being satisfied, modifying:
     an orientation of the sensor; and/or
     an orientation of a tool of the robotic device to which the sensor is coupled;
   in response to the communication demand not being satisfied after the orientation of the sensor and/or the tool has been modified, updating, based on the processed data, the path of movement to improve the radio communication; and sending the communication demand for the radio communication to the cloud platform;
wherein updating the path of movement to improve the radio communication comprises:
modifying a speed of movement of the robotic device; and/or
modifying coordinates of the path of movement within a predetermined range;
wherein the modifying the orientation of the sensor, the modifying the orientation of the tool, the modifying the speed, and the modifying the coordinates is performed in a predetermined order; and
wherein the modifying the orientation of the sensor, the modifying the orientation of the tool, the modifying the speed, and/or the modifying the coordinates are performed when a previous modification has not led to the communication demand being satisfied.

2. The method of claim 1, wherein the improvement of the radio communication comprises a change of a radio communication parameter indicative of a quality of the radio communication.

3. The method of claim 1, wherein the processing is performed in the cloud platform.

4. The method of claim 3, wherein the data relating to the path of movement to be processed is:
generated by a robotic application coupled or integral to the robotic device; and
sent, by the robotic application, to the cloud platform for processing.

5. The method of claim 3, wherein improvement of the radio communication comprises a change of a radio communication parameter indicative of (i) a quality of the radio communication of the sensor with a third device, and/or (ii) a radio communication property intrinsic to the sensor.

6. The method of claim 1, wherein the updating the path of movement is based on updated path of movement data being generated in the cloud platform.

7. The method of claim 1, wherein the modifying the speed of movement of the robotic device comprises slowing down the speed of movement when the robotic device travels through an area in which quality of the radio communication is above a predetermined threshold or when the robotic device is located at a location at which the quality of the radio communication is above the predetermined threshold.

8. The method of claim 1:
further comprising determining radio channel capacity of a radio communication channel associated with the radio communication; and
wherein the determining whether the communication demand is satisfied is based on the radio channel capacity.

9. The method of claim 1, wherein determining whether the communication demand is satisfied is based on determining a path loss of the radio communication for a path point of the path of movement.

10. The method of claim 9:
wherein determining the path loss comprises comparing a first, current bandwidth of the radio communication for the path point with a second, previously determined bandwidth of the radio communication for the path point; and
wherein data relating to the second, previously determined bandwidth is stored in a radio communication database or radio coverage database.

11. The method of claim 1, wherein the updating the path of movement comprises inserting a path segment into the path of movement, wherein quality of the radio communication is known for when the robotic device is located within the inserted path segment.

12. The method of claim 11:
further comprising, in response to the communication demand not being satisfied:
modifying an orientation of the sensor;
modifying an orientation of a tool of the robotic device to which the sensor is coupled;
modifying a speed of movement of the robotic device; and/or
modifying coordinates of the path of movement within a predetermined range;
wherein the path segment is inserted into the path of movement when none of the modifying the orientation of the sensor, the modifying the orientation of the tool, the modifying the speed, and the modifying the coordinates has led to the communication demand being satisfied.

13. The method of claim 1, wherein the data relating to the path of movement comprises:
Cartesian points of the path of movement;
an orientation of an effector of the robotic device; and/or
a time for an effector or another part of the robotic device to reach one or more predetermined points on the path of movement.

14. The method of claim 13, wherein the updating the path of movement is performed only within predetermined deviations from initial values of the Cartesian points, the orientation of the effector, and the time for the effector or the another part of the robotic device to reach the one or more predetermined points on the path of movement.

15. The method of claim 14:
wherein the deviations are accepted to be larger for connecting paths of the path of movement than for one or both of control points and control paths of the path of movement; and
wherein the robotic device must visit the control points and control paths at least within a predetermined control point range and control path range, respectively.

16. A system, comprising:
a robotic device comprising or coupled to a sensor in radio communication with a cloud platform, the robotic device comprising a robotic application running thereon or coupled thereto; and
the cloud platform, the cloud platform in communication with the robotic application;
wherein the system is configured to:
process data relating to a path of movement of the robotic device;
determine, based on the processed data, whether a communication demand is satisfied;
in response to the communication demand not being satisfied, modify:
an orientation of the sensor; and/or
an orientation of a tool of the robotic device to which the sensor is coupled;
in response to the communication demand not being satisfied after the orientation of the sensor and/or the tool has been modified, update, based on the processed data, the path of movement to improve the radio communication; and
send the communication demand for the radio communication to the cloud platform;
wherein to update the path of movement to improve the radio communication, the system is configured to:

modify a speed of movement of the robotic device; and/or modify coordinates of the path of movement within a predetermined range;

wherein the system is further configured to modify the orientation of the sensor, modify the orientation of the tool, modify the speed, and modify the coordinates in a predetermined order; and wherein the system is further configured to modify the orientation of the sensor, modify the orientation of the tool, modify the speed, and/or modify the coordinates when a previous modification has not led to the communication demand being satisfied.

* * * * *